United States Patent
Shimada

(10) Patent No.: US 7,505,015 B2
(45) Date of Patent: **\*Mar. 17, 2009**

(54) FIELD SEQUENTIAL COLOR DISPLAY APPARATUS

(75) Inventor: Naoto Shimada, Hachioji (JP)

(73) Assignee: Olympus Optical Co., Ltd., Tokyo (JP)

( * ) Notice: Subject to any disclaimer, the term of this patent is extended or adjusted under 35 U.S.C. 154(b) by 430 days.

This patent is subject to a terminal disclaimer.

(21) Appl. No.: 11/293,557

(22) Filed: Dec. 2, 2005

(65) Prior Publication Data

US 2006/0082603 A1      Apr. 20, 2006

Related U.S. Application Data

(62) Division of application No. 10/297,288, filed as application No. PCT/JP02/02009 on Mar. 5, 2002, now Pat. No. 7,002,539.

(30) Foreign Application Priority Data

Mar. 16, 2001   (JP) .................................. 2001-75268

(51) Int. Cl.
  *G09G 3/36*   (2006.01)
(52) U.S. Cl. ........................................ 345/87; 345/690
(58) Field of Classification Search .................. 345/87, 345/88, 89, 98–102, 690, 694, 698
  See application file for complete search history.

(56) References Cited

U.S. PATENT DOCUMENTS

| | | | |
|---|---|---|---|
| 4,745,485 A | 5/1988 | Iwasaki | |
| 6,061,103 A * | 5/2000 | Okamura et al. | 348/767 |
| 6,115,016 A | 9/2000 | Yoshihara et al. | |
| 6,339,411 B2 | 1/2002 | Miyazaki et al. | |
| 6,473,077 B1 | 10/2002 | Takenaka et al. | |
| 6,816,141 B1 * | 11/2004 | Fergason | 345/88 |
| 7,110,008 B2 * | 9/2006 | Katoh et al. | 345/690 |

FOREIGN PATENT DOCUMENTS

| | | |
|---|---|---|
| JP | 06-324320 A | 11/1994 |
| JP | 07-007704 A | 1/1995 |
| JP | 8-248381 A | 9/1996 |
| JP | 08-248382 A | 9/1996 |
| JP | 9-116916 A | 5/1997 |
| JP | 11-15450 A | 1/1999 |
| JP | 2000-175210 A | 6/2000 |
| JP | 2001-42283 A | 2/2001 |

\* cited by examiner

*Primary Examiner*—Duc Q Dinh
(74) *Attorney, Agent, or Firm*—Frishauf, Holtz, Goodman & Chick, P.C.

(57) ABSTRACT

A field sequential color display apparatus for sequentially displaying RGB field images so that a color frame image can be observed, comprising: an LCD display device for displaying RGB field images; a timing generation/control circuit for controlling the order of RGB field images to be displayed on the LCD display device; a pixel shifting unit for causing the beam of each pixel displayed on the LCD display device to be shifted by each frame image so as to enhance the resolution of image observed by a viewer; and an optical system for making it possible to display an image before shifted at the pixel shifting unit and an image after the shift. Among the RGB field images, the G field image having highest spectral luminous efficiency is displayed at an intermediate order within the frame images so that leakage thereof is not caused by the pixel shifting operation.

3 Claims, 14 Drawing Sheets

FIG.15

| FRAME No. | n | n+1 | n+2 | n+3 | n+4 | n+5 | n+6 | n+7 |
|---|---|---|---|---|---|---|---|---|
| LIQUID CRYSTAL CELL OPERATION | on | off | on | off | on | off | on | off |
| STANDARD OPERATION | RGB | RGB | RGB | RGB | RGB | RGB | RGB | RGB |
| CONSECUTIVE COLOR DISPLAY AT SWITCHING | RGB | BGR | RGB | BGR | RGB | BGR | RGB | BGR |
| CONSECUTIVE COLOR DISPLAY AT ON-TO-OFF | RGB | BRG | BRG | GBR | GBR | RBG | RGB | BRG |

FIELD SEQUENTIAL COLOR DISPLAY APPARATUS

CROSS REFERENCE TO RELATED APPLICATIONS

This application is a division of U.S. Ser. No. 10/297,288 filed Dec. 4, 2002 now U.S. Pat. No. 7,002,539, which is a U.S. National Phase Application under 35 USC 371 of International Application PCT/JP02/02009 filed Mar. 5, 2002.

TECHNICAL FIELD

The present invention relates to field sequential color display apparatus in which high-resolution color images are displayed by using a pixel shifting unit for shifting pixels by means of optical wobbling operation.

BACKGROUND OF THE INVENTION

Among image display apparatus using a liquid crystal display device or the like, an image display apparatus has been disclosed for example in Japanese patent applications laid open No. 6-324320 and No. 7-7704 in which resolution of the liquid crystal display device is improved by effecting a pixel shifting operation called wobbling where the optical axis of light from the liquid crystal display device is wobbled in predetermined directions.

A description will now be given with respect to the general construction of an image display apparatus in which resolution is improved by such optical wobbling operation. As shown in FIG. 1, a back light 102 for emitting white light is placed on the back side of a color liquid crystal display device 101, and a wobbling device (a pixel shifting unit) 103 for wobbling in predetermined directions the optical axis of light from the color liquid crystal device 101 is placed on the front side of the color liquid crystal display device 101. Here, odd field images and even field images of input video signal are displayed on the color liquid crystal display device 101 at the same pixels thereof through an image display control circuit 104. In accordance with their display timing, the optical axis of light from the color liquid crystal display device 101 is wobbled in predetermined directions by the wobbling device 103.

The wobbling device 103 includes a polarization changing liquid crystal plate 105 and a birefringence plate 106 which is placed on the front side thereof. Here, ON/OFF of voltage across the polarization changing liquid crystal plate 105 is controlled by a wobbling liquid crystal drive circuit 107 based on synchronizing signal of the video signal to be displayed on the color liquid crystal display device 101. The light from the color liquid crystal display device 101 is thereby transmitted without changing its polarization when the voltage is ON, while, when the voltage is OFF, the light from the color liquid crystal display device 101 is transmitted with changing its polarization through 90 degrees, effecting the wobbling operation by changing the location to be emitted from the birefringence plate 106 in accordance with such direction of polarization. It should be noted that, since the color liquid crystal display device 101 retains the image of the preceding field until rewriting of the image of the next field, one of the electrodes of the polarization changing liquid crystal plate 105 is divided into parts each with a plurality of lines such as 5 lines. The other electrode is used as a common electrode and application of voltage is controlled by selecting the one of the electrodes in accordance with the timing of line scan of the color liquid crystal display device 101.

The following operation is performed when alternately displaying odd field images and even field images on the color liquid crystal display device 101. In particular, a case is supposed here as shown in FIG. 2A that the horizontal pixel pitch is Px and the vertical pixel pitch is Py of a pixel group in delta array of the color liquid crystal display device 101. An oblique wobbling operation of 0.75 Px in the horizontal direction and 0.5 Py in the vertical direction, for example, is performed by the above described wobbling device 103 so that the pixel array of the color liquid crystal display device 101 is located at the position as indicated by the broken lines in FIG. 2B when an odd field image is to be displayed, while the pixel array is located at the position indicated by solid lines when an even field is to be displayed. Specifically, if for example Px is 18 µm and Py is 47.5 µm, the wobbling operation is effected so as to achieve an oblique distance of about 27.3 µm, shifted by 13.5 µm horizontally and 23.75 µm vertically.

For this reason, a crystallographic axis 106a of the birefringence plate 106 is set as shown in FIG. 3 in a direction inclined with respect to the XY coordinate of on the color liquid crystal display device surface and Z direction which is normal thereto. Here, when the direction of polarization of incidence agrees with the direction of polarization of light from the color liquid crystal display device, the light from the color liquid crystal display device is transmitted as extraordinary rays so as to shift the pixels. When the direction of polarization of incidence is rotated through 90 degrees with respect to the direction of polarization of light from the color liquid crystal display device, it is transmitted intact as ordinary rays without shifting the pixels.

In this manner, as shown in FIG. 4, when the image of an odd field is to be displayed on the color liquid crystal display device 101, voltage application to the region of the polarization changing liquid crystal plate 105 corresponding to the horizontal lines to be rewritten is turned ON, so as to transmit the light from such lines intact without rotating the direction of polarization through 90 degrees. The light is emitted by the birefringence plate 106 as extraordinary rays to shift the pixels. On the other hand, when the image of an even field is to be displayed, voltage application to the region of the polarization changing liquid crystal plate 105 corresponding to the horizontal lines to be rewritten is turned OFF, so as to transmit the light from the lines as rotated in the direction of polarization through 90 degrees, causing the birefringence plate 106 to emit the light intact as ordinary rays without shifting the pixels.

In addition, an image display apparatus is known to be provided with two units of such one-dimensional two-point pixel shifting unit each having a polarization changing liquid crystal plate and birefringence plate which are combined into a laminate where one of the units is rotated through 90 degrees about the axis of incident light with respect to the other so that a high resolution by two-dimensional four-point pixel shifting is achieved by performing four times of pixel shift in the vertical and horizontal directions within one frame or one field.

Further, though not related to high-resolution display using a pixel shifting unit, a field sequential color display apparatus having a construction as will be described below is disclosed in Japanese patent application laid open No. 8-248382. Specifically, the field sequential color display apparatus uses a monochrome CRT and a liquid crystal shutter (color filter) consisting of π-cell and color polarizing plate. To reduce color mixture that occurs between fields due to delay in the response speed of π-cell contained in the liquid crystal shutter, the switching timing of ON/OFF of the liquid crystal shutter is set within a blanking period occurring between two image periods of sequential color signals and the switching timing of ON/OFF is set so as not to cause color mixture.

If an attempt is made to display a high-resolution color image by applying the above described pixel shifting unit to a field sequential color display apparatus for effecting color displaying by switching among trichromatic images according to time, the following problem occurs. In particular, though there is not much problem when the liquid crystal cell is turned ON from OFF, the problem occurs when it is turned OFF from ON that pixels are seen to be displayed simultaneously at two locations in such transition period, i.e., at the original pixel location and at the pixel location shifted by pixel shifting. A color leakage is thereby caused.

In the above laid-open publication, a disclosure is made merely with respect to color mixture in the field sequential color display apparatus using a liquid crystal shutter consisting of π-cell and color polarizing plate as the color filter. It fails to mention the occurrence of color leakage in a high-resolution field sequential color display apparatus using a pixel shifting unit.

To eliminate the above problems in achieving a display at high resolution by using a pixel shifting unit in field sequential color display apparatus, it is an object of the invention to provide a field sequential color display apparatus in which sensory color mixture due to color leakage arising from the shifting of pixel can be reduced.

DISCLOSURE OF THE INVENTION

In accordance with a first aspect of the invention, there is provided a field sequential color display apparatus for sequentially displaying image information as field images by each of a plurality of color information so that a viewer can observe a color frame image, including: display means for displaying the field images; display control means for controlling the order of the field images to be displayed on the display means; pixel shifting means containing a liquid crystal cell for causing the beam of each pixel displayed on the display means to be shifted by each frame image so as to enhance the resolution of image observed by the viewer; and optical means for making it possible to display to the viewer an image before shifted at the pixel shifting means and an image after the shift. The display control means effects control so that the field image of color information having highest spectral luminous efficiency in the color information is displayed on the display means at an intermediate order except the first and last within the frame images.

In order to reduce sensory color mixture of the viewer in the case where shifting by the pixel shifting means is effected by each frame image to achieve a high resolution in field sequential color display apparatus, it is necessary to eliminate leakage (appearance of one pixel as two) of the color information image of the highest spectral luminous efficiency arising from the shifting of pixel. When shifting by the pixel shifting means is effected by each frame image, color leakage occurs in the first and last field images within frame images. No color leakage occurs in a medium field image. Accordingly, as described above, it is possible to eliminate leakage arising from pixel shifting so as to reduce sensory color mixture of the viewer such that the color information image of highest spectral luminous efficiency such as G field image having the highest spectral luminous efficiency for example in the case where the three colors of RGB are used as the plurality of color information, is displayed at an intermediate order except the first and last.

In accordance with a second aspect of the invention, there is provided a field sequential color display apparatus for sequentially displaying image information as field images by each of a plurality of color information so that a viewer can observe a color frame image, including: display means for displaying the field images; display control means for controlling the order and displaying time of the field images to be displayed on the display means; pixel shifting means containing a liquid crystal cell for causing the beam of each pixel displayed on the display means to be shifted by each frame image so as to enhance the resolution of image observed by the viewer; and optical means for making it possible to display to the viewer an image before shifted at the pixel shifting means and an image after the shift. The display control means effects control so that, of the plurality of color information displayed during a transition period of shifting of the ray by the operation of the pixel shifting means, the displaying time of field image of the color information having highest spectral luminous efficiency is shorter than the displaying time of field images of the other color information.

In this manner, leakage of the color of higher spectral luminous efficiency of the colors to be displayed during the transition time of pixel shifting can be reduced so as to reduce sensory color mixture of the viewer by effecting control such that, among the plurality of color information to be displayed during the transition period for shifting ray of each pixel by the operation of the pixel shifting means, the displaying time of a field image of the color information of highest spectral luminous efficiency is shorter than the displaying time of a field images of other color information.

In accordance with a third aspect of the invention, the field sequential color display apparatus according to the second aspect further includes temperature measurement means for measuring an ambient temperature of the pixel shifting means containing the liquid crystal cell, wherein the display control means controls the displaying time of field image of each color information and the driving timing at which the pixel shifting means shift the ray, on the basis of temperature measured by the temperature measurement means.

By thus providing the temperature measurement means to control the displaying time of field image of each color information and the driving timing of the pixel shifting means on the basis of measured temperatures, it becomes possible to control the displaying time of field image of each color information and the driving timing of the pixel shifting means correspondingly to change in the transition period of the pixel shifting means arising from change in temperature. A reduction of sensory color mixture can be achieved more suitably corresponding to change in temperature.

In accordance with a fourth aspect of the invention, there is provided a field sequential color display apparatus for sequentially displaying image information as field images by each of a plurality of color information so that a viewer can observe a color frame image, including: display means for displaying the field images; display control means for controlling the order of the field images to be displayed on the display means; pixel shifting means containing a liquid crystal cell for causing the beam of each pixel displayed on the display means to be shifted by each frame image so as to enhance the resolution of image observed by the viewer; and optical means for making it possible to display to the viewer an image before shifted at the pixel shifting means and an image after the shift. The display control means causes the color information of the field image displayed before and that after switching of frame image to be identical with each other.

By thus causing the field images displayed before and after the switching of frame image to have an identical color information, it is possible to avoid an occurrence of color mixture arising from pixel shifting at the time of switching of frame image.

In accordance with a fifth aspect of the invention, the field sequential color image display apparatus according to the fourth aspect is characterized in that the color information of the field images caused to be identical is sequentially changed.

In the case where the same color information becomes visible at each switching of frame image, a flicker is caused due to the fact that the interval of such same color information becoming visible is wider than the interval of other color information. Such flicker can be reduced, however, by sequentially changing at each switching of frame image the color information of which color mixture at the time of the switching of frame image is prevented as described above.

In accordance with a sixth aspect of the invention, there is provided a field sequential color display apparatus for sequentially displaying image information as field images by each of a plurality of color information so that a viewer can observe a color frame image, including: display means for displaying the field images; display control means for controlling the order of the field images to be displayed on the display means; pixel shifting means containing a liquid crystal cell for causing the beam of each pixel displayed on the display means to be shifted by each frame image so as to enhance the resolution of image observed by the viewer; and optical means for making it possible to display to the viewer an image before shifted at the pixel shifting means and an image after the shift. The display control means causes one field period displayed before or after switching the frame image to be a non-displaying field period during which nothing is displayed.

By such construction, no image is displayed on the display means in the one field period at ON-to-OFF or OFF-to-ON operation of the liquid crystal cell of the pixel shifting means. It is thereby possible to avoid an occurrence of color mixture due to leakage arising from the shifting of pixel.

In accordance with a seventh aspect of the invention, there is provided a field sequential color display apparatus for sequentially displaying image information as field images by each of three colors of color information so that a viewer can observe a color frame image, including: display means for displaying the field images; display control means for controlling the order of the field images to be displayed on the display means; pixel shifting means containing a liquid crystal cell for causing the beam of each pixel displayed on the display means to be shifted by each frame image so as to enhance the resolution of image observed by the viewer; and optical means for making it possible to display to the viewer an image before shifted at the pixel shifting means and an image after the shift. The display control means selects field images of two colors from the field images of the three colors to form one frame image and effects control so as to cause the field images of the three colors to be displayed at least once in every two frame images.

In this manner, image information of two colors is selected from the image information of the three colors for forming a color image to form one frame image and the field images of the three colors are displayed at least once in every two frame images so as to make it possible to reduce the number of fields to be displayed in one frame image. It is thereby possible to make slower the operation speed of the display means for displaying field images and it becomes easier to display the field image having high spectral luminous efficiency alone at high resolution.

In accordance with an eighth aspect of the invention, the display control means of the field sequential color display apparatus according to the seventh aspect always selects a green field image as the field image of one color in the field images of the two colors which are selected to form one frame image and further includes a white balance adjusting means using signal values of two green field images that are close to each other in the displaying order so as to calculate a signal value of green field image to be displayed after these so that an inconsistency in white balance due to the fact that green field images are displayed at a greater number of times does not occur.

When, as in the seventh aspect, one frame image is formed by selecting image information of two colors from the image information of the three colors for forming a color image and at the same time the field images of the three colors each are displayed at least once in every two frame images, it results in the color information of one color alone of the image information of the three colors being selected for every one frame so that inconsistency is caused in white balance. To eliminate this, in the eighth aspect, the white balance adjusting means is provided as the above to adjust the signal value of green field image that is selected for every one frame. It is thereby possible to adjust inconsistency in white balance.

BRIEF DESCRIPTION OF THE DRAWING

FIG. 15 explains the technique of reducing color mixture arising from the pixel shifting operation by changing the displaying order of RGB field images of the field sequential color displaying.

DESCRIPTION OF THE PREFERRED EMBODIMENTS

Figure 1:
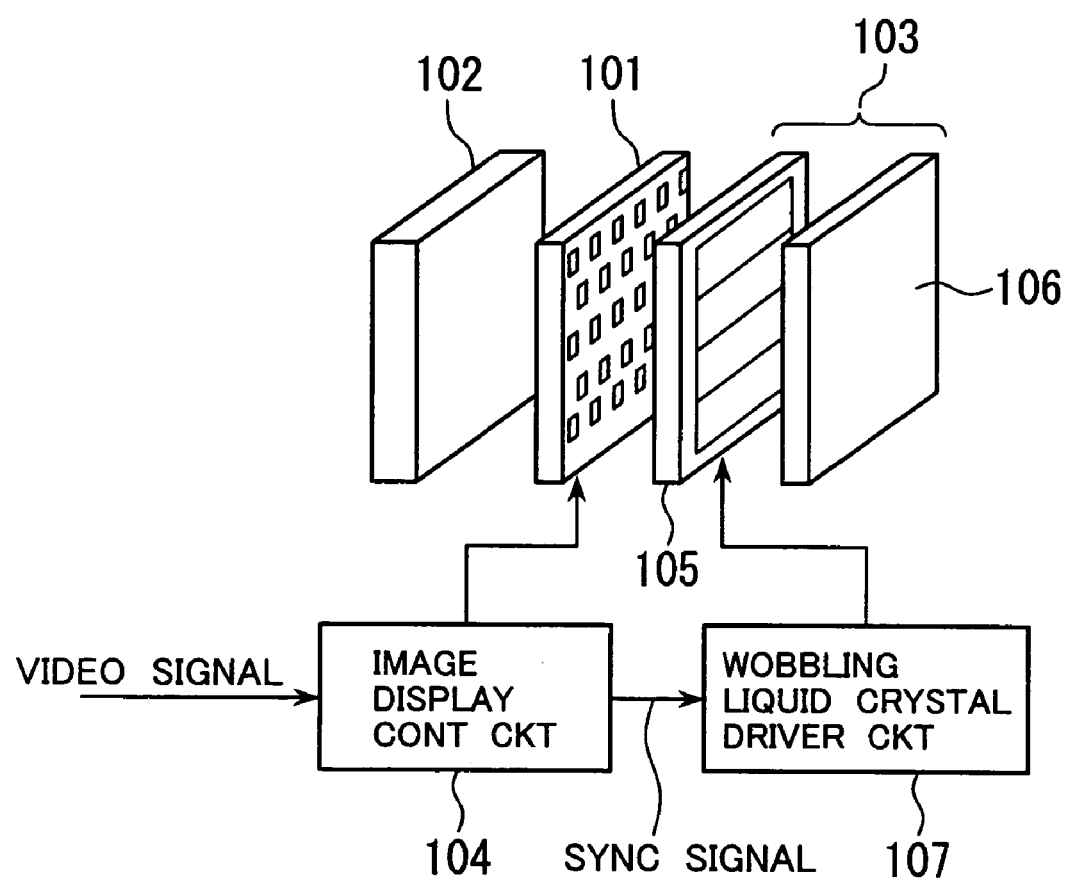
FIG. 1 schematically shows an image display apparatus using a conventional wobbling device (pixel shifting unit).
Figure 2A:
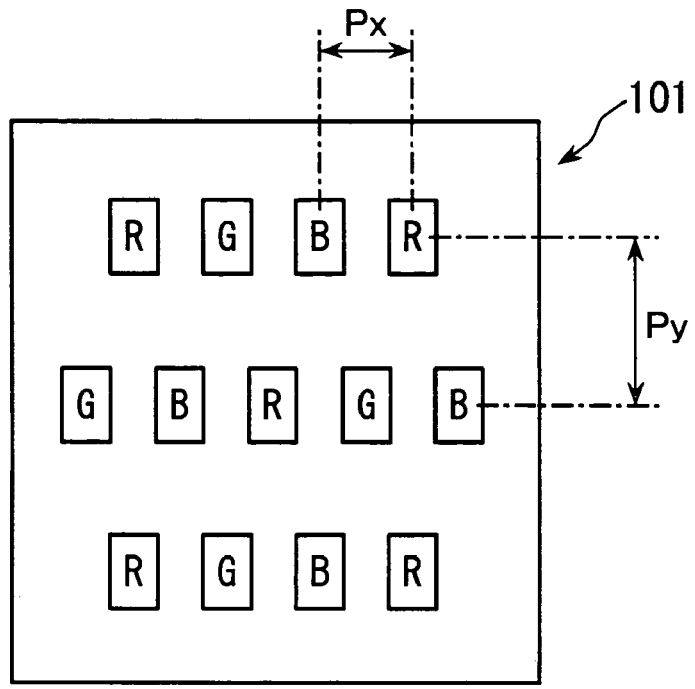
FIGS. 2A and 2B show the manner of pixel array by the wobbling operation of a color liquid crystal display device.
Figure 2B:
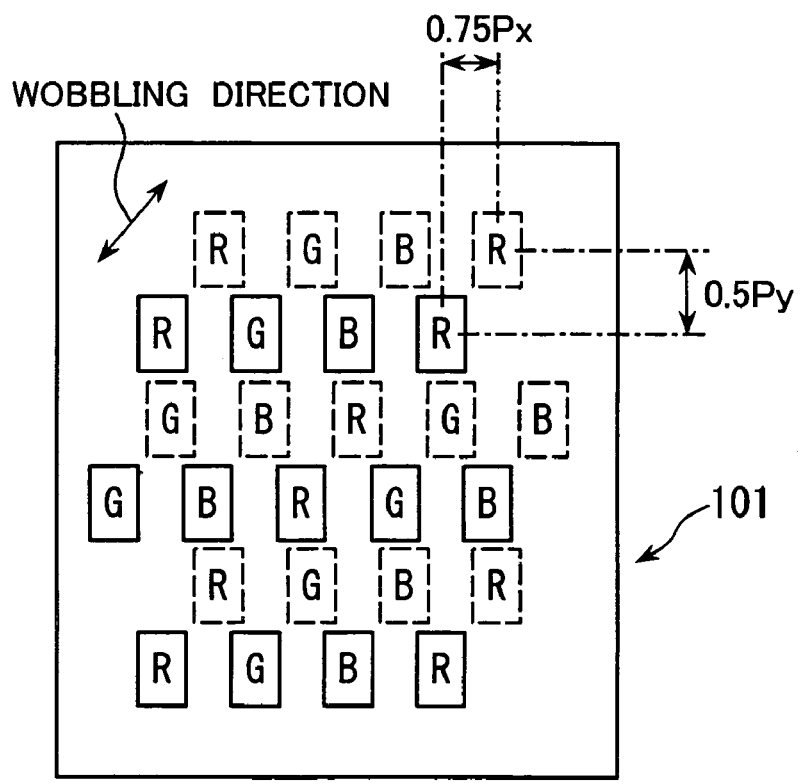
Figure 3:
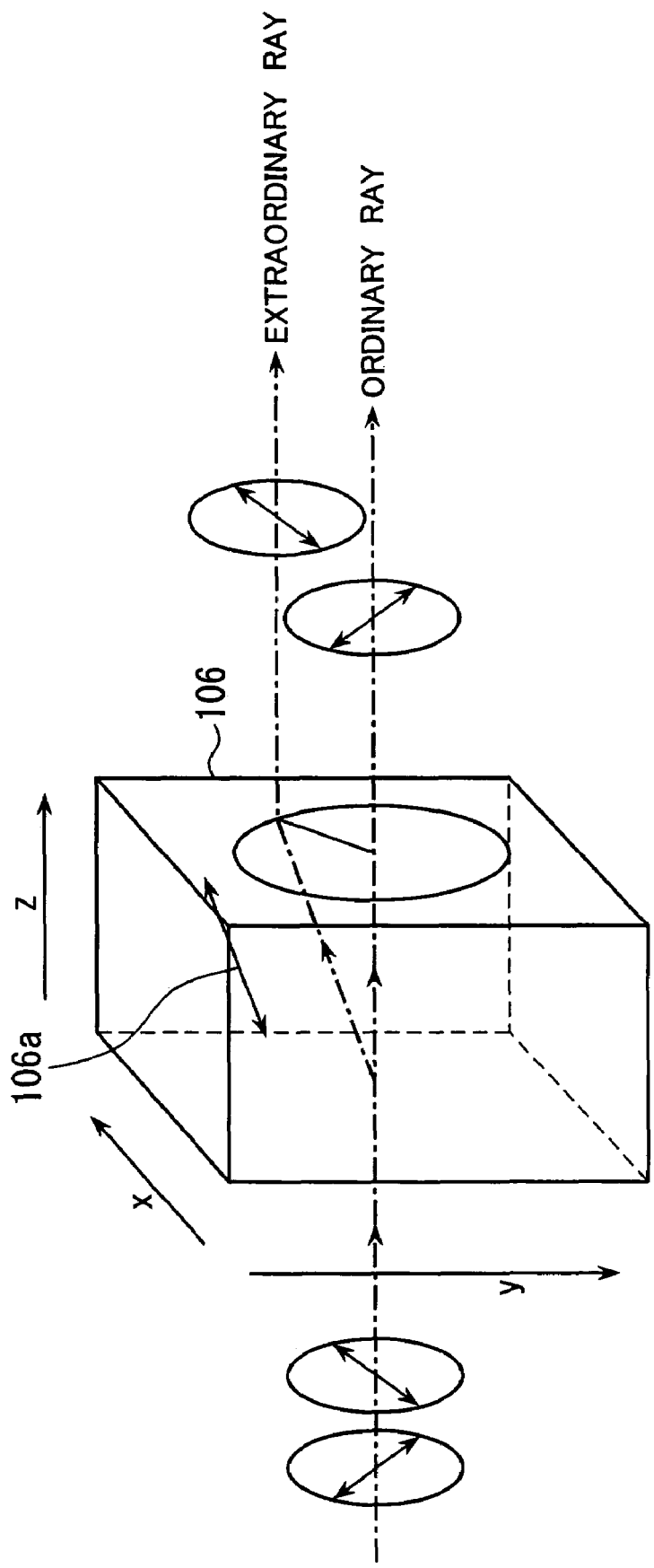
FIG. 3 illustrates the operation of a birefringence plate of the wobbling device.
Figure 4:
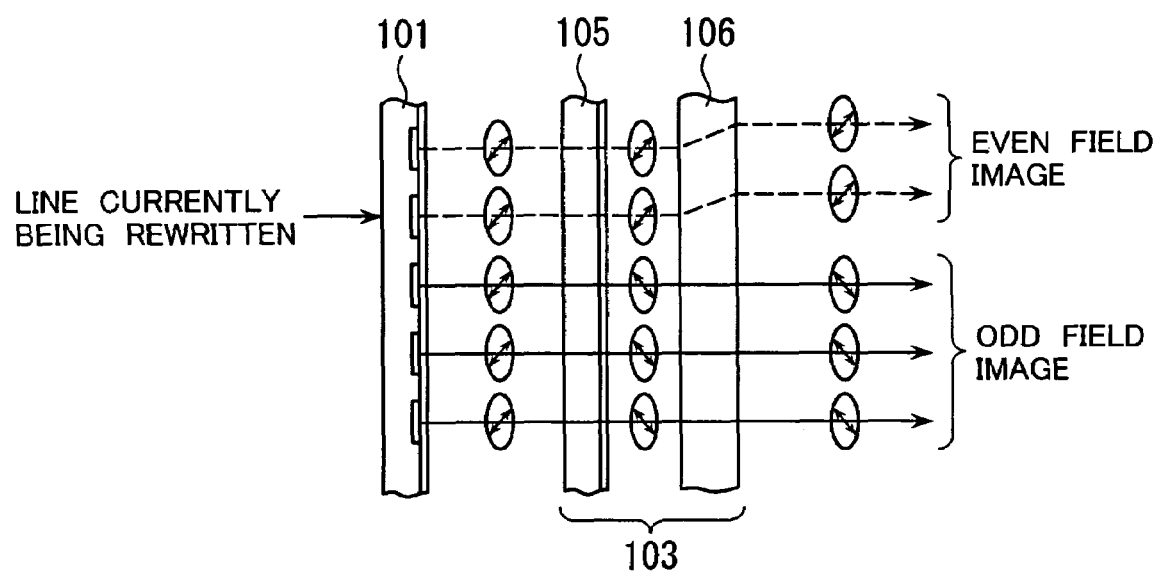
FIG. 4 shows the manner of pixel shifting in an odd field and even field by the wobbling device of the image display apparatus shown in FIG. 1.
Figure 5A:
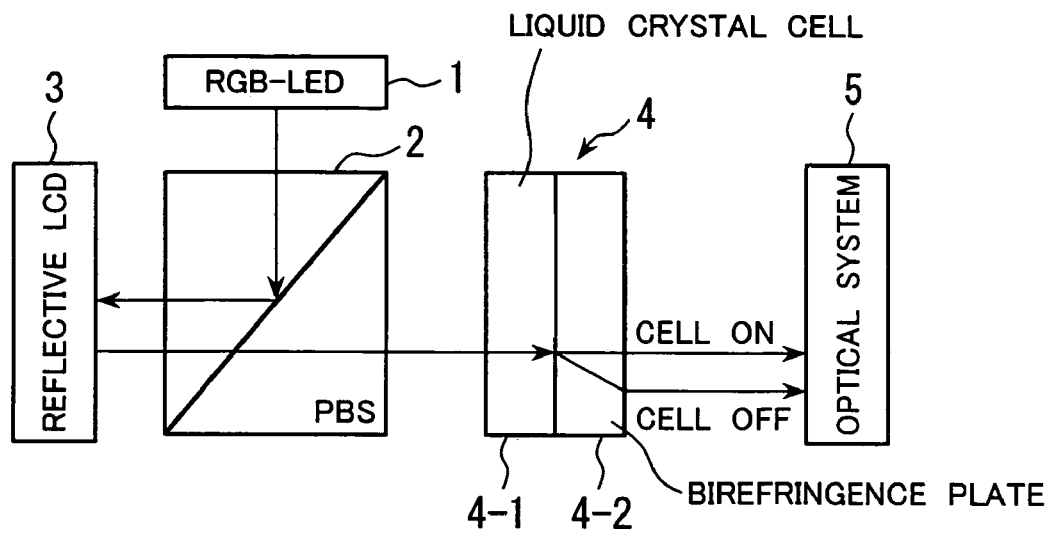
FIGS. 5A to 5C schematically show the optical construction and the manner of pixel shifting in an embodiment of the field sequential color display apparatus according to the invention.

A description will now be given by way of the attached drawings to explain the invention in detail. FIG. 5A schematically shows the optical construction of an embodiment of the field sequential color display apparatus according to the invention. Included in FIG. 5A are: 1, a light source consisting of LED for emitting illuminating light of the colors of R, G, B; 2, a polarizing beam splitter (PBS); 3, a reflecting type LCD display device; 4, a pixel shifting unit, i.e., 2-point pixel shifting unit consisting of a liquid crystal cell 4-1 and a birefringence plate 4-2; and 5, an optical system.

Figure 5B:
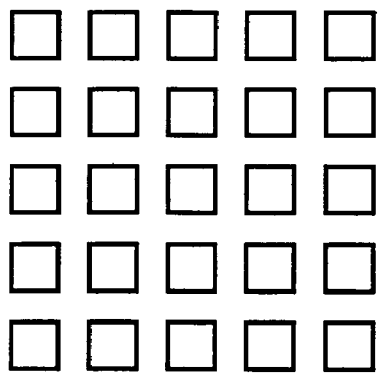
Figure 5C:
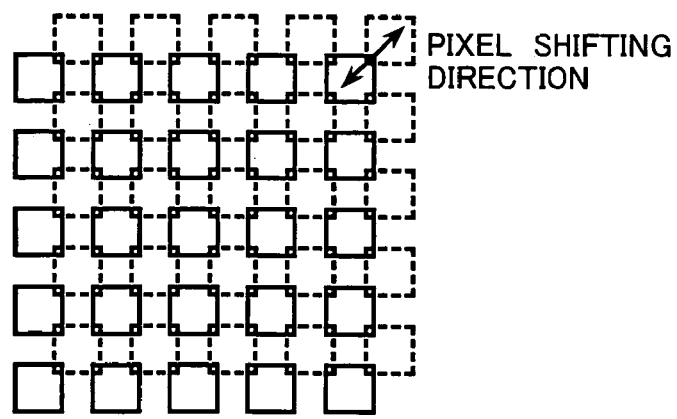

In thus constructed field sequential color display apparatus, R, G, B field images are sequentially displayed on the reflecting type LCD display device 3 and at the same time an illuminating light from the RGB-LED light source 1 is caused to irradiate the reflecting type LCD display device 3 through the beam splitter 2 so that R, G, B field images enter the pixel shifting unit 4 through the beam splitter 2. By means of ON/OFF control at each frame image of the liquid crystal cell 4-1 of the pixel shifting unit 4, these are then displayed through the optical system 5 at the pixel array location as indicated by dotted lines in FIG. 5C which is pixel-shifted from the displaying of the original LCD display device pixel array shown in FIG. 5B. A high-resolution color displaying is thereby performed.

Figure 6:
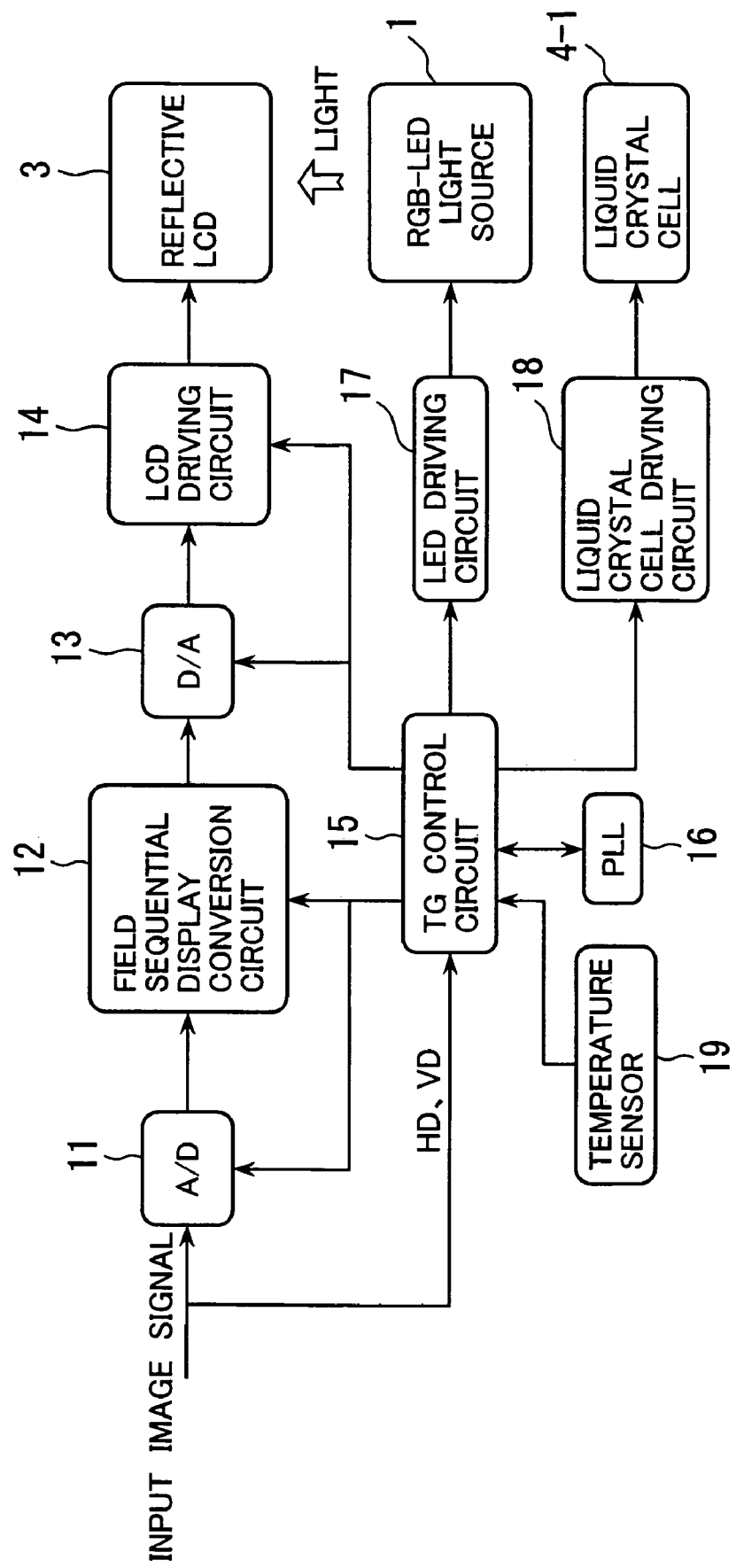
FIG. 6 is a block diagram showing the construction of electrical circuits for generating for example driving signals to be supplied to each section of the field sequential color display apparatus shown in FIG. 5A.

FIG. 6 is a block diagram showing an electrical circuit construction to generate such as driving signals to be supplied to each section of the field sequential color display apparatus having the construction as described. FIG. 6 includes: 11, A/D conversion circuit for effecting A/D conversion of input image signals; 12, a field sequential display conversion circuit for tripling the rate of the A/D converted image signal to separate it into R, G, B signals so as to output R, G, B field sequential signals; 13, D/A conversion circuit for effecting D/A conversion of the R, G, B field sequential signals from the field sequential display conversion circuit 12; and 14, LCD driving circuit to which the D/A-converted R, G, B field sequential signals are inputted to generate driving signal for driving the reflecting type LCD display device 3.

It further includes: 15, a timing generation/control circuit to which a synchronizing signal of the input image signal is inputted to generate timing signals to the respective sections and to control each section; 16, PLL circuit for controlling the timing generation/control circuit 15; 17, LED driving circuit to which a timing signal from the timing generation/control circuit 15 is inputted to generate a driving signal for driving the RGB-LED light source 1; 18, a liquid crystal cell driving circuit to which a timing signal from the timing generation/control circuit 15 is inputted to generate a driving signal for controlling ON/OFF of the liquid crystal cell 4-1 of the pixel shifting unit 4; and 19, a temperature sensor for detecting ambient temperature of the liquid crystal cell 4-1, based on the detected value at which the timing generation/control circuit 15 controls the driving timing of RGB-LED light source 1 and the liquid crystal cell 4-1. In addition, the timing generation/control circuit 15 controls such as the order of the color field images and the number of field images in each field image.

A description will now be given to the operation method which features the present invention in the field sequential color display apparatus having the construction as described. First, the field sequential color display operation will be described by way of the timing chart in FIG. 7. At the same time of displaying field images by sequentially applying R, G, B field sequential field signals to the reflecting type LCD display device 3 through the LCD driving circuit 14, the LED lighting signals for lighting LED light source 1 of each of RGB colors are provided from the LED driving circuit 17 correspondingly to the field images. Field sequential color images are thereby obtained on the reflecting type LCD display device 3.

Figure 8:
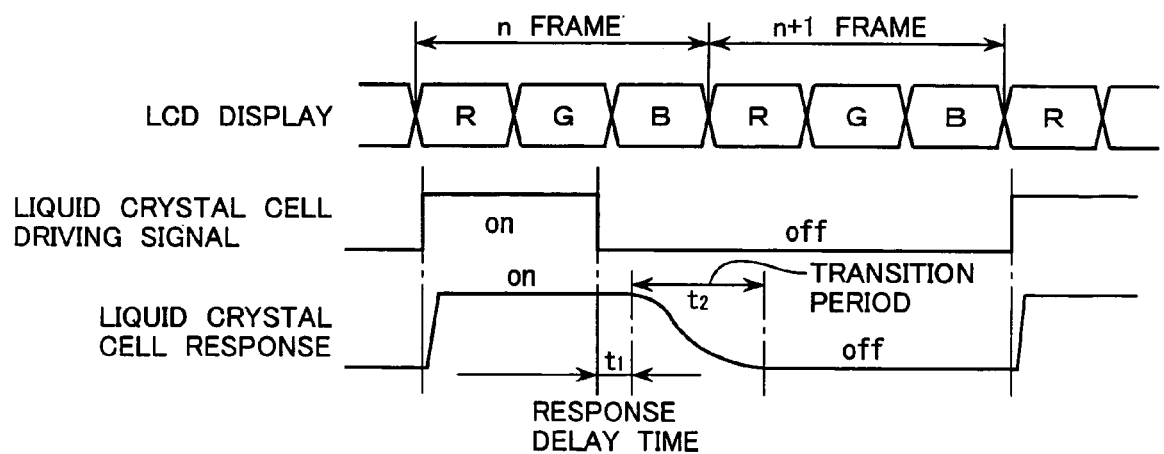
FIG. 8 shows response characteristics of the liquid crystal cell of the pixel shifting unit.

When pixel shifting is performed for each frame image by the pixel shifting unit 4 with respect to the field sequential color images obtained in the above manner from the reflecting type LCD display device 3, a liquid crystal cell driving signal of which ON/OFF is controlled as shown in FIG. 8 is provided to the liquid crystal cell 4-1 from the liquid crystal cell driving circuit 18. Based on this driving signal, especially because of response delay at the time of ON to OFF, the liquid crystal cell 4-1 requires a response delay time $t_1$ and transition period $t_2$ until the liquid crystal cell in ON state is completely turned into OFF state. Accordingly, during the transition period until the original pixel location is displayed in a completely shifted manner by the pixel shifting operation, pixels are displayed at two locations, causing a displaying leakage. If different colors are displayed at the two locations, a color mixture is caused.

Figure 9:
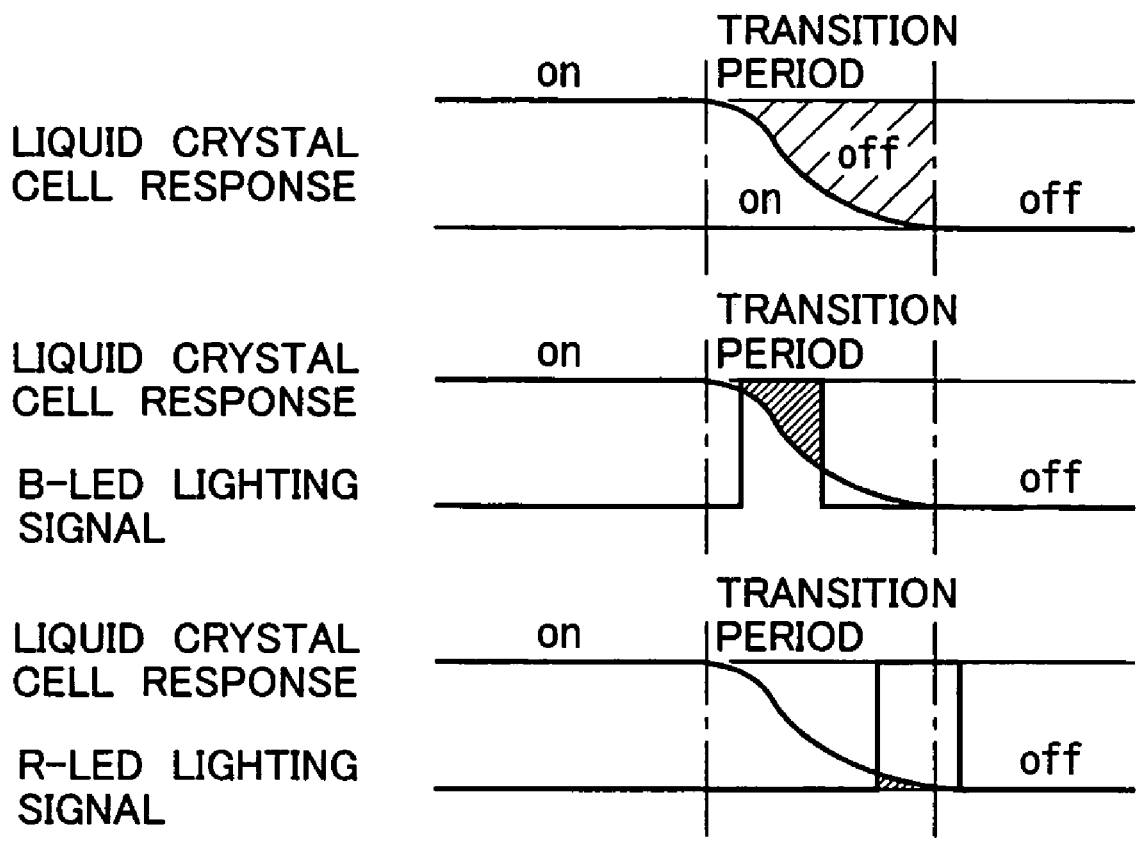
FIG. 9 explains the manner of occurrence of color leakage and color mixture arising from the pixel shifting operation of the pixel shifting unit.

The state of occurrence of such color mixture will now be described in detail. As shown in FIG. 9, when B-LED light source for example is lit in a beginning period of the transition period of the response operation of the liquid crystal cell, blue display is leaked to OFF-location at the rate of the slanting line portion. Further, when R-LED light source is lit in an ending period of the transition period, red display is leaked to ON-location at the rate of the slanting line portion.

Figure 7:
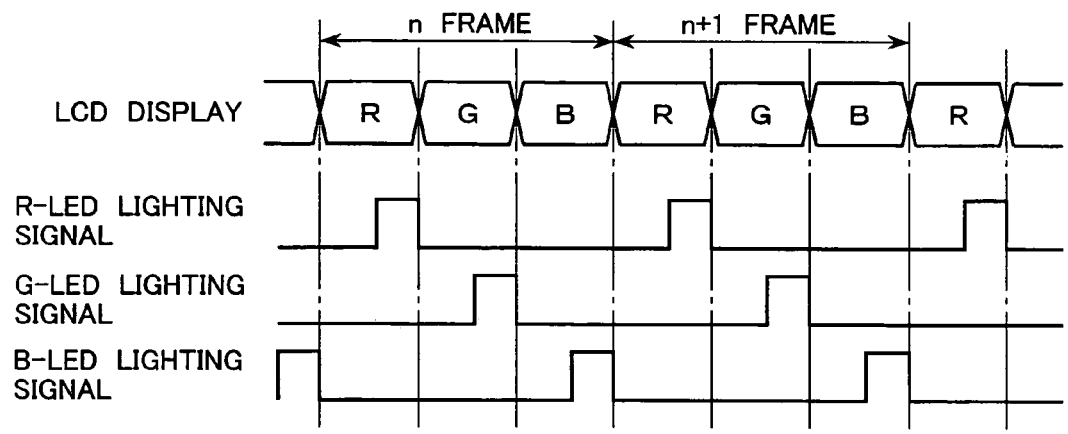
FIG. 7 shows timings for performing a standard field sequential color displaying in the field sequential color display apparatus shown in FIGS. 5A and 6.

When shifting by pixel shifting unit is effected at each frame image in the field sequential color display apparatus, a color leakage occurs in the first and last field images within frame image, i.e., in the B field signal and R field signal in the example shown in FIG. 7. No color leakage occurs in G field image at the middle thereof. To reduce sensory color mixture of the viewer, it is necessary to eliminate a leakage resulting from the pixel shifting operation of the color information image having highest spectral luminous efficiency. When the three primary colors of RGB are used as the color information as in the example shown in FIG. 7, the color of G has the highest spectral luminous efficiency. For this reason, G field image is displayed at the middle except the first and last as shown in FIG. 7, i.e., as the second field of each frame. A leakage by the pixel shifting operation of G field image having the highest spectral luminous efficiency can thus be eliminated to reduce sensory color mixture of the viewer.

In the description of the above first operation method, color mixture is reduced by setting the G field signal having the highest spectral luminous efficiency as the second frame signal so as to eliminate leakage resulting from the pixel shifting operation thereof. On the other hand, it is also possible to eliminate leakage to reduce color mixture by means of adjustment of the timing at which LED light source 1 is lit and the timing of ON/OFF of the liquid crystal cell 4-1.

Figure 10A:
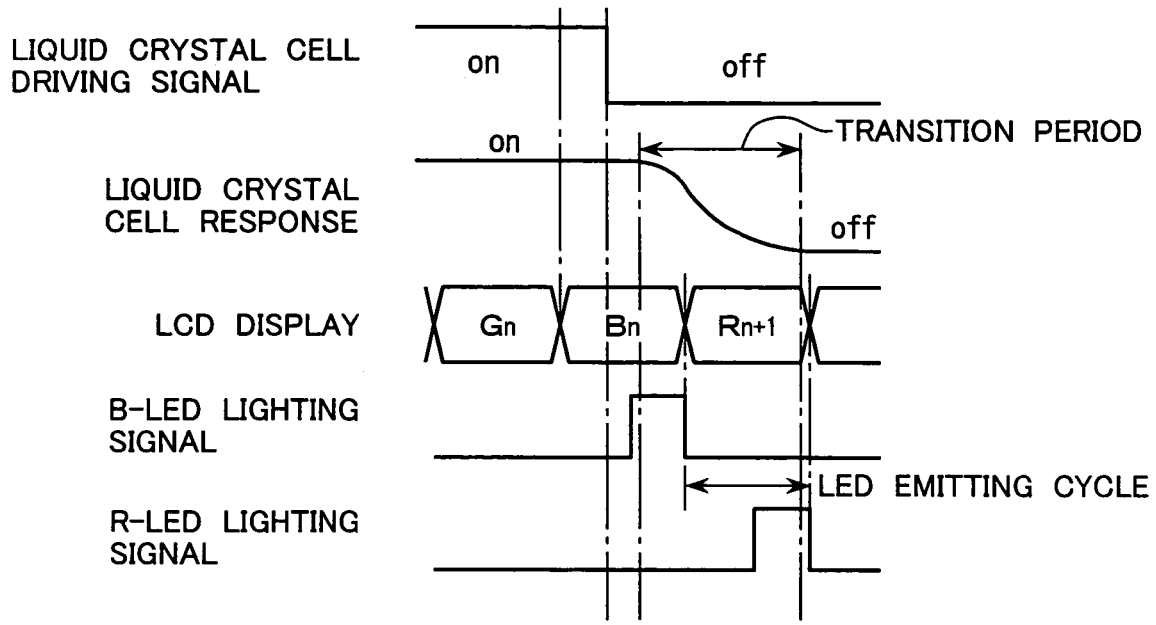
FIGS. 10A and 10B explain manners of reducing leakage and color mixture by adjustment of the lighting timing of LED light source and the driving timing of the liquid crystal cell.

In particular, in a normal case as shown in FIG. 10A, the lighting signal of B-LED light source 1 is turned ON in a beginning period of the ON-to-OFF transition period in the response operation of the liquid crystal cell 4-1 of the pixel shifting unit 4, and the lighting signal of R-LED light source 1 is ON in an ending period of the transition period. With such lighting operation condition of LED light source and ON/OFF timing of the liquid crystal cell, however, both B field image of n–th frame and R field image of (n+1)–th frame penetrate the transition period and are leaked into each other to be displayed in a state of color mixture.

Figure 10B:
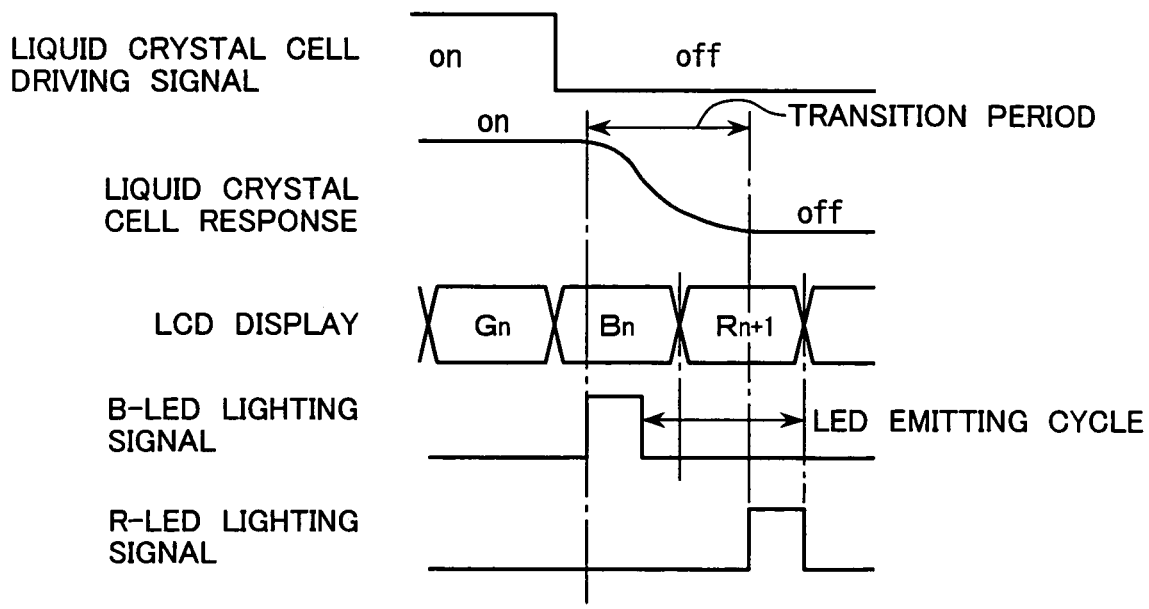

In another operation method of the invention, therefore, since the R field image has a higher spectral luminous efficiency than the B field image, ON/OFF-timing of the liquid crystal cell and the lighting timing of R-LED light source are regulated as shown in FIG. 10B so as not to light R-LED light source to the extent possible in the transition period where leakage occurs so that leakage is not caused in the R field image which has such higher spectral luminous efficiency. In particular, the lighting timing of B-LED light source is set with a priority on the lighting of R-LED light source to adjust the emitting interval of LED light source (LED emission cycle). In the example shown in FIG. 10B, ON/OFF-timing of the liquid crystal cell is somewhat advanced and at the same time the lighting timing of B-LED light source is advanced to widen the LED emitting interval. A leakage of R field image can thus be reduced or eliminated to reduce or prevent an occurrence of color mixture. In this connection, the emitting timing of RGB-LED light source is preferably in an ending period of the displaying period due to the response characteristics of the LCD display device.

Figure 11:
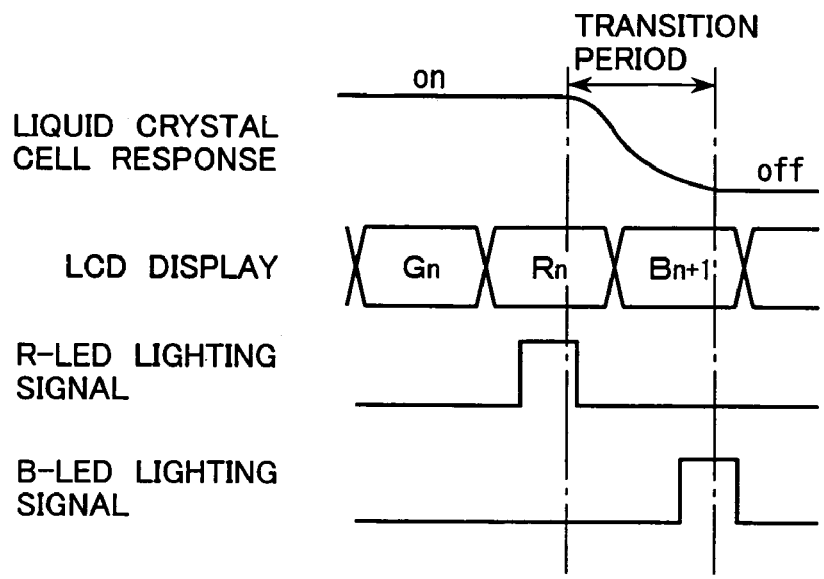
FIG. 11 explains another manner of effecting reduction in leakage and color mixture by adjustment of the lighting timing of LED light source and the driving timing of the liquid crystal cell.

Further, in the case as shown in FIG. 11 where the displaying order of the field sequential color field images at the reflecting type LCD display device 3 is converse to the case of FIG. 10, i.e., in the case where the last field of n–th frame is the R field image and the first field of (n+1)–th frame is the B field image, the timing is set also with a priority on the displaying of the R field image which has a higher spectral luminous efficiency. In particular, the lighting period of R-LED light source for displaying the R field image is set so that it does not enter the transition period of the liquid crystal cell to the extent possible. It is thereby possible to reduce leakage of the R field image so as to reduce sensory color mixture.

Now, the transition period of the liquid crystal cell 4-1 of the pixel shifting unit 4 is highly dependent on temperature and the transition period fluctuates. Accordingly, it is possible to more suitably reduce leakage so as to reduce color mixture by setting the timings correspondingly to the fluctuation in the transition period of the liquid crystal cell due to temperatures. In regulating the timings, an ambient temperature of the liquid crystal cell is detected at the temperature sensor 19 so that, based on such detected value, the lighting timing of LED light source 1 and the driving timing of the liquid crystal cell 4-1 are regulated at the timing generation/control circuit 15.

Figure 12:
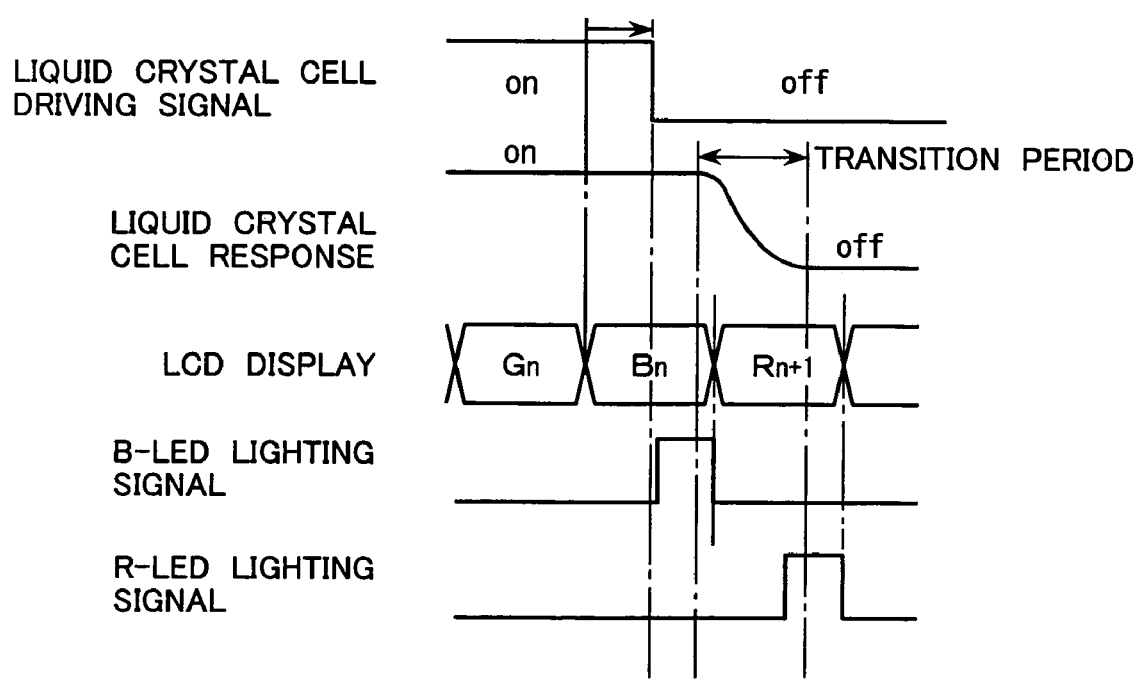
FIG. 12 shows the manner of the lighting timing of LED light source and the driving timing of the liquid crystal cell in the case where the transition period of liquid crystal cell becomes shorter due to a rise in temperature.

FIG. 12 shows the case where the transition period of the liquid crystal cell 4-1 becomes shorter due to a temperature rise. The lighting timing in this case, even if the same as the lighting timing shown in FIG. 10A (the case of lighting in an ending period of each field image signal), is capable of making shorter the period during which the lighting period of R-LED light source enter the transition period so that leakage can be reduced. In other words, when the transition period has become shorter, it is possible to prevent an occurrence of color mixture even if the lighting timing of B-LED light source is delayed so as to display B field image which is more like B.

Figure 13:
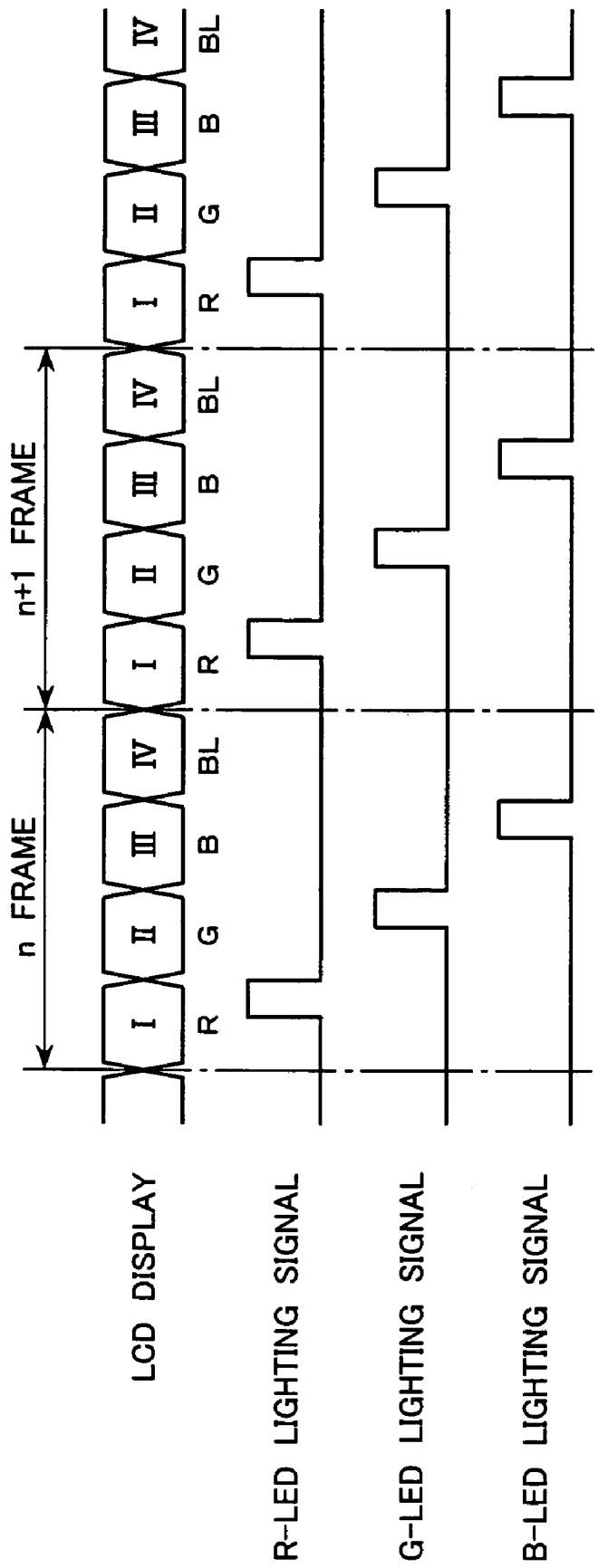
FIG. 13 explains the manner of effecting reduction in leakage and color mixture due to pixel shifting operation by adding a non-displaying field to form 1-frame 4-field structure.

While, in the above described operation methods, the image signal has been shown as of 1-frame 3-field structure, a description will now be given with respect to an operation method for preventing leakage and reducing color mixture by 1-frame 4-field structure where a non-displaying field is provided. In this method, as shown in the timing chart of FIG. 13, 1-frame 4-field structure is used and a field of the mode referred to as BL (black) is provided at the last or fourth field so that the fourth field in such BL mode is used as the non-displaying field. In this case, LED light source is not lit and a dark portion results during such non-displaying field period so that, even if leakage occurs due to the pixel shifting operation at each frame, an effect due to such leakage is not produced. Accordingly, the state of further reduced leakage can be achieved in the pixel shifting operation.

Figure 14:
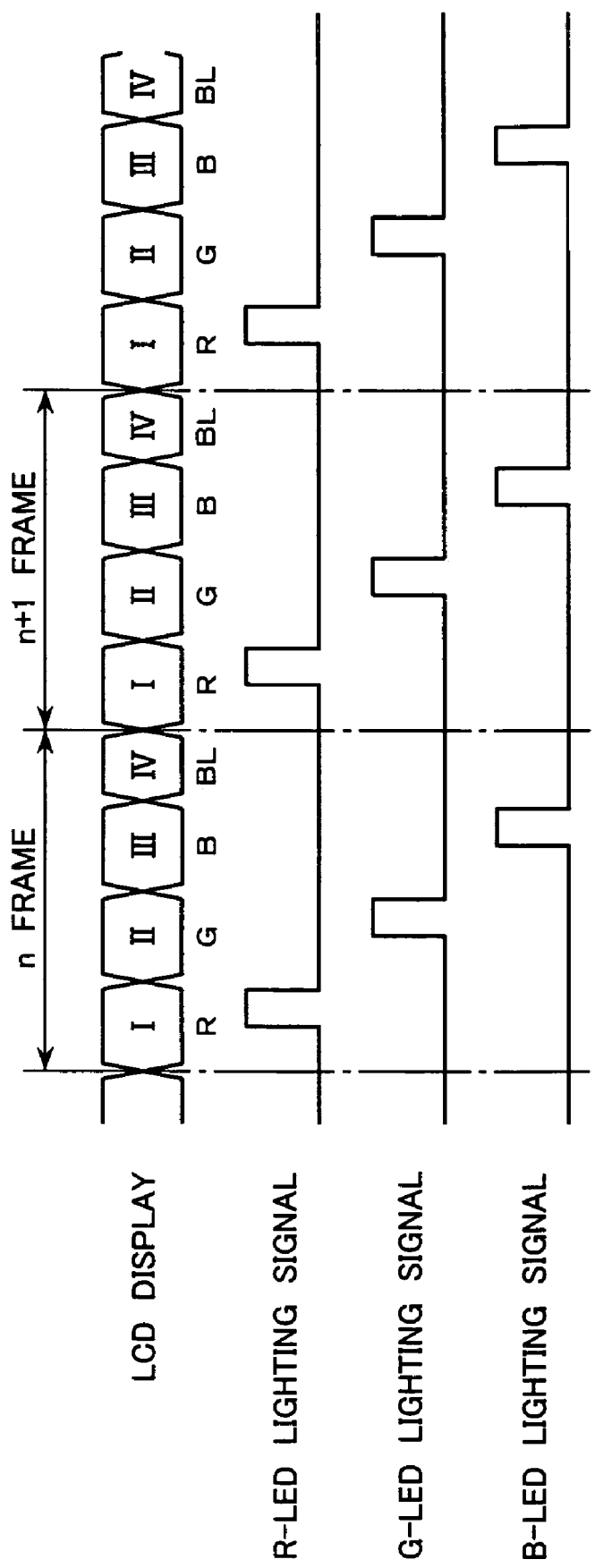
FIG. 14 shows the manner of making shorter the displaying period of the non-displaying field in the 1-frame 4-field structure.

When the effective displaying periods of the respective fields are the same with each other in the operation method where the image signal is formed as 1-frame 4-field structure as described, it is possible that the images of the three fields of R, G, B before the added field become less visible due to the effect of the response speed of the LCD display device 3. Here, since it is not necessary that the added fourth field in 1-frame 4-field structure has the same displaying period as each of the other fields, the displaying period of the fourth field can be somewhat reduced as shown in FIG. 14. It is thereby possible to provide a margin in the operation speed of LCD display device in the effectively displayed three fields of RGB.

While the fourth field is formed as a non-displaying field in the operation method using the above described 1-frame 4-field structure, a similar effect and advantage can be obtained also by using the first field as a non-displaying field. A similar effect and advantage can also be achieved, without providing a non-displaying period as the fourth field in the above described manner, by providing a blanking period (black displaying period:period for displaying nothing) toward the switching point within the displaying fields located before and after the switching point of frame image (pixel shifting point) in time. In this case, the field period of field having a blanking period becomes longer correspondingly to the blanking period than the field period of field without a blanking period.

In each of the above described operation methods, a description has been given with respect to a method of reducing an occurrence of leakage and color mixture in the image signal of 1-frame 3- or 4-field structure having a specified displaying order of the color field images in each frame. A description will now be given with respect to method for preventing color mixture by changing the displaying order of the respective color field images in each frame of 1-frame 3-field structure.

FIG. 15 explains the method for preventing color mixture by changing the displaying order of the color field images in each frame of the image signal having 1-frame 3-field structure. In a standard operation in field sequential color display system where the image signal is of 1-frame 3-field structure, if three primary colors of RGB are used, a specified order such as RGB, RGB . . . is used as the displaying order in each frame. In the method of the invention, on the other hand, the displaying order of RGB field images is changed correspondingly to the pixel shifting operation at each frame so that field images of the same color are consecutively displayed before and after the switching of each frame.

In the illustrated example, the field displaying order is changed at each frame so that fields of the same color are located before and after the switching of frame such as RGB, BGR, RGB, BGR . . . By thus changing the displaying order of RGB field images in each frame, an occurrence of color mixture can be avoided even when leakage is caused by the pixel shifting operation at the switching of frame, since it is of the same color.

If field images of the same color are displayed before and after the switching of frame as described above, the displaying interval of the color to be consecutively displayed at the switching becomes wider than the displaying interval of other colors so as to result in a state where flicker occurs, though an occurrence of color mixture is prevented due to the consecutive displaying. A method for mitigating such flicker state will now be described.

In the present invention, the pixel shifting operation is performed by means of ON/OFF of the liquid crystal cell at the time of switching of frame in the field sequential color display apparatus. The problem of occurrence of leakage and color mixture resulting from pixel shifting occurs at the switching timing of ON to OFF of the liquid crystal cell. Instead of consecutively displaying field images of the same color before and after the switching of frame at every switching of frame, therefore, an occurrence of color mixture can be prevented while reducing the occurrence of the above described flicker by setting the displaying order of field images so that field images of the same color are displayed before and after the switching of frame only when the liquid crystal cell is switched from ON to OFF.

Figure 16:
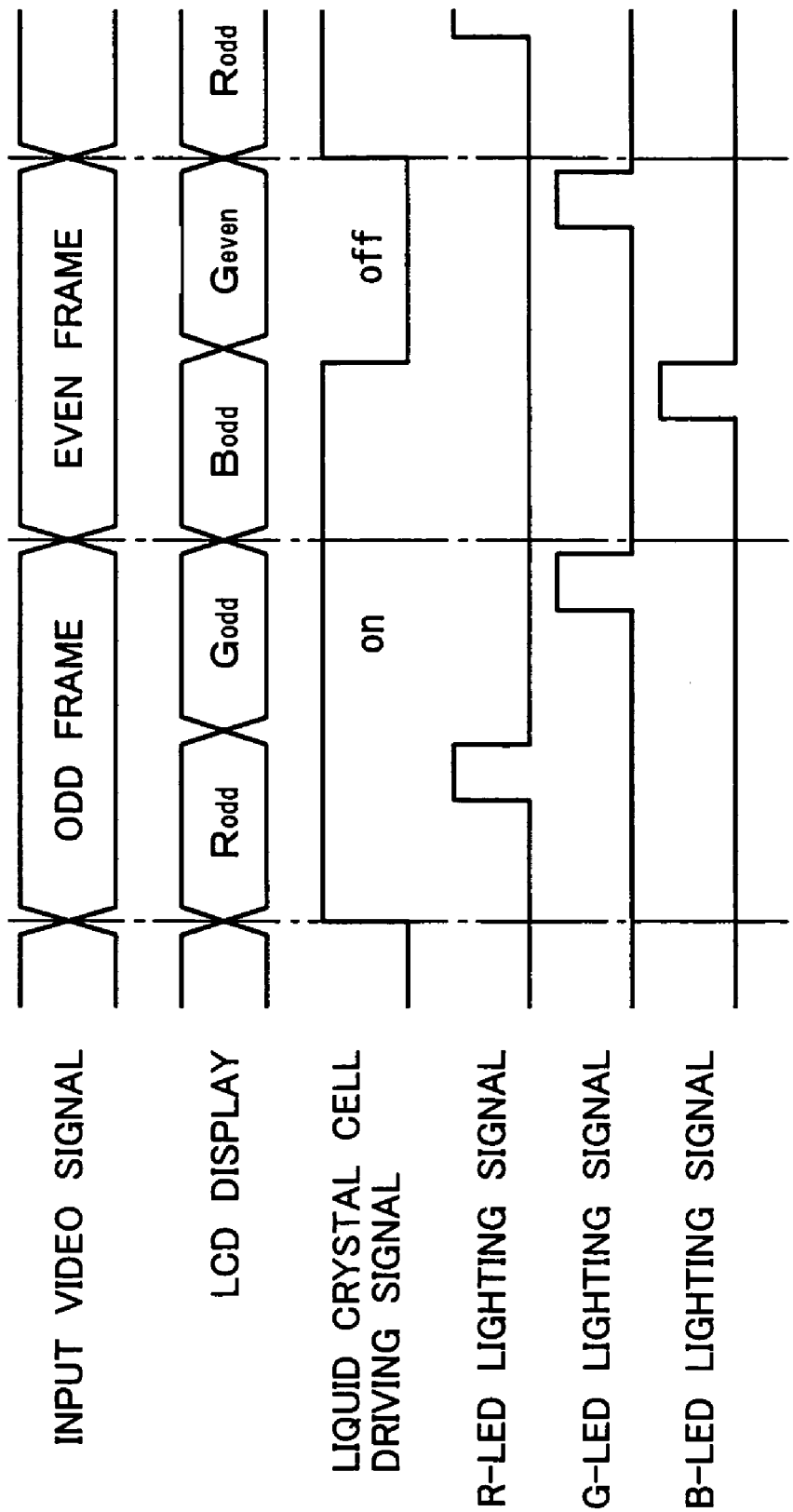
FIG. 16 is a timing chart for explaining a high-resolution display in the field sequential color displaying by 2-frame 4-field structure.

A description will now be given by way of the timing chart of FIG. 16 with respect to an embodiment of the case of applying the pixel shifting method by pixel shifting unit to field sequential color display system of 2-frame 4-field structure where the field images of the three colors are displayed at least once in every two frames. In the illustrated example, of image signal of 2-frame 4-field structure, only G field signal having high spectral luminous efficiency is displayed in each frame so that such G field signal having high spectral luminous efficiency alone is displayed at high resolution by the pixel shifting operation of pixel shifting unit.

In the case of such construction, since the image signal is of 2-frame 4-field structure, it is possible to make slower the operation speed of LCD display device 3 so as to provide a margin. Further only the displaying of G having high spectral luminous efficiency can be effected at high resolution.

In 2-frame 4-field structure, if as described only G field image is displayed in every frame i.e., twice in two frames so as to be displayed at a greater number of times than the displaying of other R, B field images, an inconsistency occurs in white balance. To be matched with the other colors by eliminating such inconsistency in white balance, the video signal to be supplied to LCD display device at each G field is set for each pixel by computation from G signals of two frames. It is thereby possible to perform a high-resolution displaying with maintaining a white balance.

A description will now be given with respect to the setting of video signal to be supplied to LCD display device at each G field from G signals of two frames. Supposing the input level of odd-frame G signal as Godd and the input level of even-frame G signal as Geven and also supposing the output levels of G video signals to be supplied to LCD display device in odd and even frames as L(Godd) and L(Geven), respectively, these are expressed as follows.

If Godd≧Geven:

$\Delta G$=Godd−Geven $L$(Godd)=$k1\{$(Godd−$\Delta G$)/2$\}$+$\Delta G$ $L$(Geven)=$k2$(Geven/2)

If Godd<Geven $\Delta G$=Geven−Godd $L$(Godd)=$k1$(Godd/2)

$L$(Geven)=$k2\{$(Geven−$\Delta G$)/2$\}$+$\Delta G$ where k1, k2 are factors to be set in accordance with the characteristics of light source and pixel shifting unit. Such as the settings of respective signal levels for the above described white balance adjustment are all performed by the timing generation/control circuit and by the correction of RGB image signal levels.

While an example using a reflecting type as the LCD display device has been shown in the above described embodiments, it is naturally also possible to use a transmitting type LCD display device which uses a back light.

EFFECT OF THE INVENTION

As has been described, since the field sequential color display apparatus according to the first aspect of the invention is constructed to display the field image of color information having highest spectral luminous efficiency at an intermediate order in frame image, it becomes possible to reduce an occurrence of sensory color mixture by eliminating leakage arising from the shifting of pixel of the color information image having highest spectral luminous efficiency. In the image display apparatus according to the second aspect of the invention, since, of the plurality of color information to be displayed during the transition period for shifting the beam by the pixel shifting means, the displaying time of field image signal of the color information having the highest spectral luminous efficiency is shorter than the displaying time of the other color information, the leakage of color of higher spectral luminous efficiency can be reduced so as to reduce sensory color mixture. In the field sequential color display apparatus according to the third aspect of the invention, since the displaying timing of each color field image and the driving timing of the pixel shifting means are controlled on the basis of temperatures measured by the temperature measurement means, it becomes possible to control the displaying timing of each color field image and the driving timing of the pixel shifting means correspondingly to changes in the transition period of the pixel shifting means due to temperature change so as to more suitably reduce sensory color mixture corresponding to temperature change.

In the field sequential color display apparatus according to the fourth aspect of the invention, since the field images displayed before and after switching of frame image are made to have the same color information with each other, it is possible to avoid an occurrence of color mixture arising from pixel shifting occurring when the frame image is switched. In the field sequential color display apparatus according to the fifth aspect of the invention, since the color information of the field images to be identified before and after switching of frame image is sequentially changed, the identified color information can be dispersed to reduce flicker. In the field sequential color display apparatus according to the sixth aspect of the invention, since one field period displayed before or after switching of frame image is caused to be a non-displaying field period during which nothing is displayed, it is possible to prevent an occurrence of color mixture due to leakage arising from the shifting of pixel. In the field sequential color display apparatus according to the seventh aspect of the invention, since two colors are selected from the image information of three colors for constituting a color image to form one frame image and the field images of the three colors are displayed at least once in every two frames, it is possible to reduce the number of fields to be displayed in one frame so that the operation speed of the display means can be made slower and it becomes possible to display the color field image having high spectral luminous efficiency alone at high resolution. In the field sequential color display apparatus according to the eighth aspect of the invention, G field image having high spectral luminous efficiency can be displayed at high resolution while adjusting inconsistency in white balance.

What is claimed is:

1. A field sequential color display apparatus for sequentially displaying field images corresponding to a plurality of colors to display a plurality of color frame images, wherein each of the field images is a single-color image and each of said color frame images is formed from a plurality of the field images, said field sequential color display apparatus comprising:

display means for sequentially displaying the single-color field images one-by-one;

display control means for controlling a display order in which the field images are displayed by the display means;

pixel shifting means, including a liquid crystal cell, for shifting alternating ones of the color frame images, by shifting a beam from each pixel displayed on the display means for a shifted one of the color frame images; and optical means for transmitting to a viewer both shifted color frame images and unshifted color frame images;

wherein the display control means controls display of the field images so as to minimize, to a greatest possible extent, an overlap amount of a transition period of the pixel shifting means during which the beam of said each pixel is shifted with display periods of each of the field images.

2. A field sequential color display apparatus for sequentially displaying field images corresponding to a plurality of colors to display a plurality of color frame images, wherein each of the field images is a single-color image and each of said color frame images is formed from a plurality of the field images, said field sequential color display apparatus comprising:

display means for sequentially displaying the single-color field images one-by-one;

display control means for controlling a display order in which the field images are displayed by the display means;

pixel shifting means, including a liquid crystal cell, for shifting alternating ones of the color frame images, by shifting a beam from each pixel displayed on the display means for a shifted one of the color frame images; and optical means for transmitting to a viewer both shifted color frame images and unshifted color frame images;

wherein display periods of a plurality of the field images overlap with a transition period of the pixel shifting means during which the beam of said each pixel is shifted, and the display control means controls display of the field images so as to minimize an amount of overlap of the transition period with one of the display periods corresponding to a color having a higher spectral luminous efficiency than the color of any other of the display periods overlapping the transition period.

3. A field sequential color display apparatus for sequentially displaying field images corresponding to a plurality of colors to display a plurality of color frame images, wherein each of the field images is a single-color image and each of said color frame images is formed from a plurality of the field images, said field sequential color display apparatus comprising:

display means for sequentially displaying the single-color field images one-by-one;

display control means for controlling a display order in which the field images are displayed by the display means;

pixel shifting means, including a liquid crystal cell, for shifting alternating ones of the color frame images, by shifting a beam from each pixel displayed on the display means for a shifted one of the color frame images; and optical means for transmitting to a viewer both shifted color frame images and unshifted color frame images;

wherein the display control means controls display of the field images such that each said color frame image includes an undisplayed period, during which nothing is displayed for one field period, at a beginning or an end of the plurality of field images making up the color frame image, so as to prevent color mixture of the field images due to delay in response by the pixel shifting means.

* * * * *